United States Patent
Chan

[15] 3,643,214
[45] Feb. 15, 1972

[54] SOLID-STATE BURGLAR ALARM SYSTEM FOR AUTOMOBILE

[72] Inventor: Ronald E. Chan, Chicago, Ill.
[73] Assignee: Lino Engineering, Inc., Chicago, Ill.
[22] Filed: Nov. 23, 1970
[21] Appl. No.: 91,916

Related U.S. Application Data

[63] Continuation-in-part of Ser. No. 788,455, Jan. 2, 1969, abandoned.

[52] U.S. Cl. .................................. 340/64, 340/53, 307/10, 180/114
[51] Int. Cl. ........................................................ B60r 25/04
[58] Field of Search .................... 340/53, 63, 64, 65; 307/10; 180/114

[56] References Cited

UNITED STATES PATENTS 3,422,398  1/1969  Rubin ..................................... 340/63

*Primary Examiner*—Alvin H. Waring
*Attorney*—Kinzer, Dorn and Zickert

[57] ABSTRACT

Solid-state burglar alarm system for operation with the courtesy light circuit of an automobile, wherein the alarm system includes a main switch hidden within the automobile for energizing and deenergizing the alarm system, means for disabling the ignition system, delay means for permitting the authorized operator to leave the automobile before the alarm is set, and delay means to permit the authorized operator to reenter the automobile and deenergize the alarm system before it would normally cause the alarm to sound.

14 Claims, 11 Drawing Figures

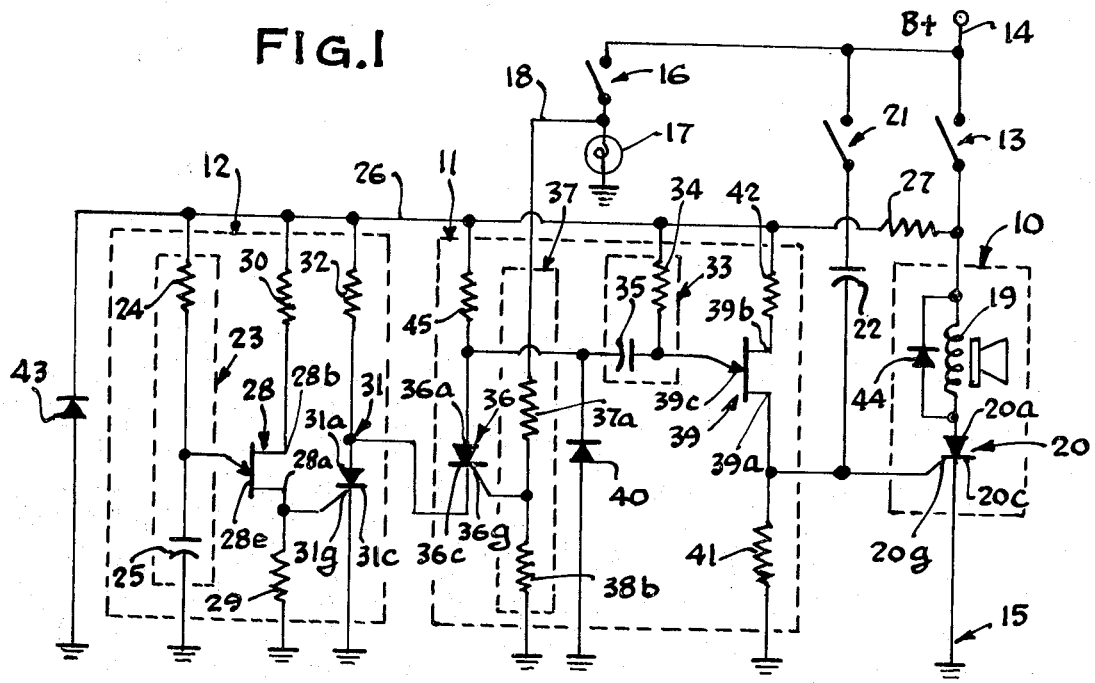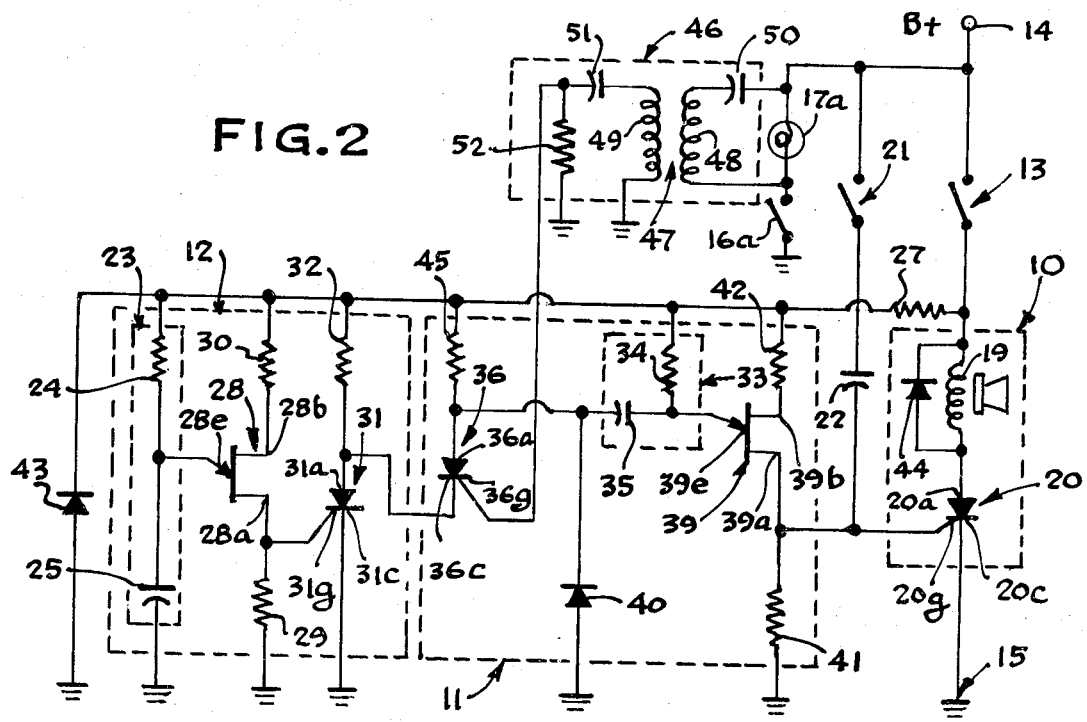

3,643,214
FIG.3
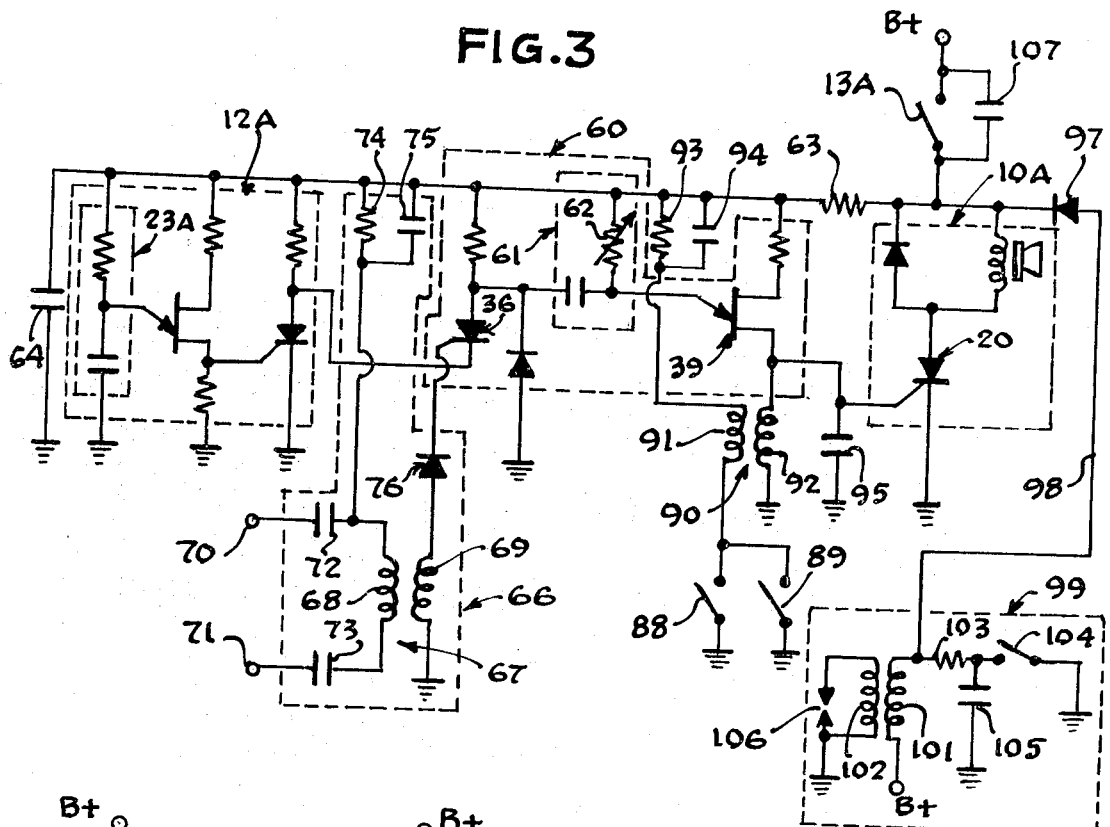
FIG.4   FIG.5   FIG.6
FIG.7
Inventor
Ronald E. Chan
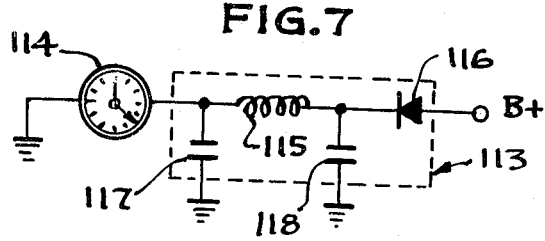
Attorneys Inventor
Ronald E. Chan
By Kinger, Dora & Zickert
Attorneys Inventor
Ronald E. Chan
By Kriger, Dorn & Ziebert
Attorneys 3,643,214

1

SOLID-STATE BURGLAR ALARM SYSTEM FOR AUTOMOBILE

This application is a continuation-in-part of application Ser. No. 788,455, filed Jan. 2, 1969, and now abandoned.

This invention relates in general to a solid state burglar alarm system for an automobile, and particularly to an alarm system having a main switch hidden within the automobile, thereby eliminating an outside accessible key-operated switch that normally advertises the existence of an alarm system, and still more particularly to an alarm system for an automobile having a main switch within the automobile and being capable of permitting an authorized person to exit and enter the automobile without sounding the alarm, although it should be appreciated the alarm system could also be employed in securing a building.

The usual type of burglar alarm system for an automobile includes a key-operated switch accessible on the outside of the automobile, which serves to activate and deactivate the alarm system following exiting of and prior to entering of the automobile. Such an accessible switch is easily detected visually, thereby indicating to unauthorized persons that the automobile is equipped with an alarm system. In some cases, unauthorized persons will then cause the alarm system to be deactivated before making entrance.

The present invention overcomes the above difficulties by providing an alarm system having a main switch hidden within the automobile for energizing and deenergizing the alarm system. Accordingly, it is not possible to visually detect whether an automobile equipped with an alarm system of the present invention has such an alarm system, thereby not alerting any unauthorized person. Further, the alarm system of the present invention has an exit timer that permits the authorized person to close the main switch for energizing the alarm system, and depart from the automobile within a reasonable time before the alarm system is actually set or armed. An entrance timer is also provided to permit an authorized person to reenter the automobile and deenergize or deactivate the alarm system prior to it being triggered by the act of reentering the automobile. A person not authorized to enter the automobile and not being aware of any alarm system, because of the entrance timer delaying the firing of the alarm system, will normally be completely within the automobile before the alarm system is fired, thereby enhancing the possibility of catching the unauthorized person in the act of theft. Moreover, the alarm system disables the ignition circuitry, thereby making it impossible to start the automobile. The alarm system of the present invention is triggered by opening the doors, trunk or hood, or by attempting to use any electrical device of the car circuitry. Additionally, bumping or tipping of the car will trigger the alarm. Utilizing the courtesy light circuit reduces the cost of installation, renders installation easy and quick, and also somewhat conceals the presence of the alarm system, since special door-operated alarm system switches are not necessary.

It is therefore an object of the present invention to provide a new and improved burglar alarm system for an automobile or like vehicle, or for the securing of a building.

Another object of this invention is in the provision of a solid state alarm system for an automobile or like vehicle that is capable of being connected to respond to a courtesy light circuit, and which includes a hidden main switch within the vehicle for energizing and deenergizing the alarm system.

Still another object of this invention is to provide an alarm system for an automobile or like vehicle having a main switch located within the vehicle for energizing and deenergizing the alarm system, and including an exit timer for enabling an authorized person to exit from the vehicle following closing of the main switch, and an entrance timer for permitting an authorized person to enter the vehicle and open the main switch prior to firing of the alarm.

A further object of the invention is to provide an alarm system for an automobile or like vehicle that disables the ignition system when set to prevent starting the engine.

2

Other objects, features and advantages of the invention will be apparent from the following detailed disclosure, taken in conjunction with the accompanying sheets of drawing, wherein like numerals refer to like parts, in which:

FIG. 1 is an electrical schematic diagram of the alarm system according to the present invention;

FIG. 2 is an electrical schematic diagram of the invention illustrating a modified hookup arrangement with a courtesy light circuit;

FIG. 3 is an electrical schematic diagram of a further embodiment of the invention;

FIG. 4 is an electrical schematic diagram of a typical automobile courtesy light circuit;

FIG. 5 is an electrical schematic diagram of another typical automobile courtesy light circuit;

FIG. 6 is an electrical schematic diagram of a modified switching arrangement for activating and deactivating the alarm circuit of FIG. 3, including a modified arrangement for disabling the ignition circuit;

FIG. 7 is an electrical schematic diagram of a suitable choke for use with electric clocks or the like to prevent the operation of the clock from effecting the alarm circuit;

Figure 8:
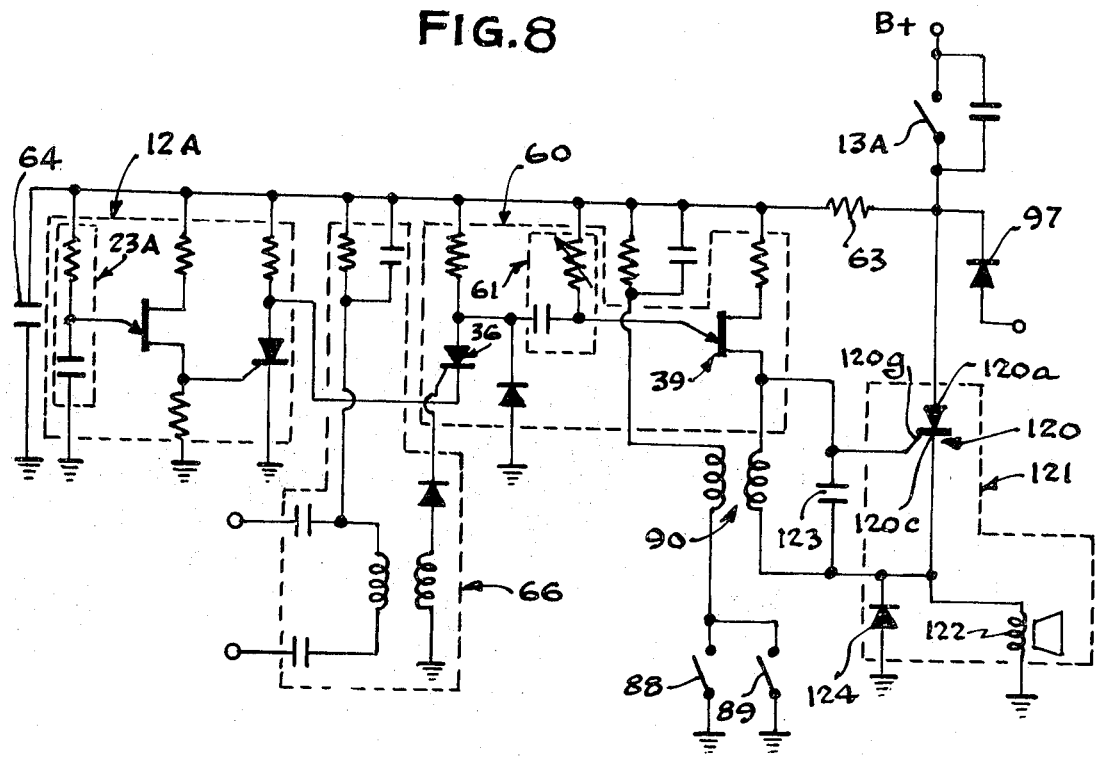
FIG. 8 is an electrical schematic diagram of a still further embodiment, differing in the manner in which the alarm device is connected to the circuit.

The burglar alarm system of the present invention will be generally described as applicable for a passenger-type automobile, but it should be appreciated that it could be applied to trucks or any other type of vehicle. Further, the alarm system is especially applicable for use with a vehicle having a courtesy light circuit. Most automobiles of today include a courtesy light circuit, that is door operated, whereby opening of a door energizes the courtesy light circuit to turn on a light fixture for illuminating the interior of the automobile, thereby facilitating the safe entering and exiting of an automobile. Courtesy light switches are located in the door openings and are responsive to opening and closing of a door to energize and deenergize the courtesy light. In the event that the alarm system of the present invention is to be installed in an automobile not having a courtesy light circuit, a suitable switch operated by the doors could easily be installed. It is preferable that each door of an automobile have a courtesy light switch, although such is not absolutely necessary to render the present invention useful. While the alarm system of the present invention is primarily concerned with operation from a courtesy light circuit, wherein a delay in firing the alarm allows entering and deenergization of the alarm by the rightful owner, it will be appreciated that suitable hood and/or trunk switches would be employed to bypass the courtesy light circuit and cause immediate triggering of the alarm circuit upon unauthorized entrance to the hood and/or trunk.

Referring now to the drawings, the alarm system of the present invention includes generally an alarm circuit 10, a triggering circuit 11, and a presetting circuit 12. A main switch 13, to be mounted at a hidden location within the automobile, serves to energize the alarm system and deenergize the alarm system. Thus, when the main switch 13 is closed, it will connect the alarm system to B+, the usual 12 VDC supply of an automobile, the positive being indicated at 14 and the negative ground side being indicated at 15.

The courtesy light circuit illustrated in FIG. 1 is that found in the current models of Ford automobiles, and includes a courtesy light switch 16 connected at one side to the positive voltage 14 and at the other side to a courtesy light or lamp 17, which has one side connected to ground. Thus, the courtesy light switch 16 is in series with the courtesy light 17. While only a single courtesy light switch 16 is shown, it will be appreciated that any number may be provided in accordance with the number of doors in an automobile since these switches are responsive to the opening and closing of automobile doors. The output of the courtesy light circuit for operation of the alarm system is taken through line 18, which is tapped into the courtesy light circuit between the courtesy light switch 16 and the courtesy light 17. The signal generated by the closing of the courtesy light circuit responding to the opening of a door is fed into the triggering circuit 11 in a manner that will be more clearly evident hereinafter following describing of the triggering circuit.

The alarm circuit 10 includes an alarm device 19 that may actually constitutes a siren, a horn, or any other sound-generating device, or any other type of signaling device. The alarm device 19 is connected on one side to the main switch 13, and on the other side to the anode 20a of a silicon-controlled rectifier SCR 20. The cathode 20c is connected to ground, while the gate 20g is connected to the output of the triggering circuit 11. Further, the gate 20g of the SCR 20 is connected to one side of a hood and/or trunk switch 21 through a coupling capacitor 22. The other side of the hood or trunk switch 21 is connected directly to the positive side of the voltage supply. Accordingly, when the main switch 13 is closed and the alarm is set, closing of the hood or trunk switch 21 immediately applies a voltage to the gate 20g of the alarm circuit SCR 20 to fire the SCR and energize the alarm device 19.

The presetting circuit 12 includes the exit timer 23. The exit timer herein illustrated is a conventional, solid state, RC timer, including a resistor 24 and a capacitor 25; although it should be appreciated that a mechanical timer can be used in place of the RC timer. The resistor 24 and capacitor 25 are connected in series with the capacitor 25 being connected to ground, while the resistor 24 is connected to the positive voltage line 26. Further, while the resistor 24 is illustrated as being fixed, thereby fixing the timing period, it should be appreciated that the resistor could be variable to adjust the timing period, if so desired. It is believed that a 30 second timing period for an exit timer 23 will be satisfactory. The positive voltage line 26 is connected to one side of the main switch 13 through a decoupling resistor 27, which also serves to reduce the voltage to the presetting and triggering circuits.

The output of the exit timer 23 is taken from the common connection of the resistor 24 and capacitor 25 and connected to the emitter 28e of a unijunction transistor 28. Base one 28a of the unijunction transistor 28 is connected to ground through a load resistor 29, while base two 28b is connected to the positive line 26 through a resistor 30. The output of the unijunction transistor 28 is delivered to the gate 31g of the SCR 31. The cathode 31c of the SCR 31 is connected to ground while the anode 31a is connected through a load resistor 32 to the positive line 26.

The presetting circuit 12 functions to set the alarm system upon timing out of the exit timer 23 to enable the triggering circuit 11 to be triggered upon closing of the courtesy light circuit and the courtesy light switch 16. The triggering circuit includes the entrance timer 33, which is of the usual RC type for a predetermined period of time of about 5 seconds, although the resistor could be variable for adjusting the time delay period. This timer includes a resistor 34 connected on one side to the positive voltage line 26 and on the other side to a capacitor 35. The capacitor is, in turn, connected to the anode 36a of an SCR 36. The anode 36a is also connected to the positive line 26 through a load resistor 45. The cathode 36c of the SCR 36 is connected to the anode 31a of the presetting circuit SCR 31. Upon firing of the SCR 31, the cathode 36c of the triggering circuit SCR 36 is connected to ground. The gate 36g of the SCR 36 is connected to a signal generating circuit 37 defined by a voltage divider including resistors 38a and 38b that are connected in series between ground and the line 18 leading to the courtesy light circuit. Closing of the courtesy light switch 16 impresses a signal on the gate 36g to fire the SCR 36 when the circuit has been preset, and the cathode 36c is then connected to ground through the fired SCR 31.

Upon timing out of the entrance timer 33, following its energization by firing of the SCR 36, a pulse is delivered to the emitter 39e of the unijunction transistor 39. Inasmuch as the impedance of the SCRs 36 and 31 is too great for the timer 33, a diode 40 is connected between the common of the capacitor 35 and the anode 36a, and ground. This permits a pulse to be delivered to the emitter of the unijunction transistor 39 when the timer 33 times out. Base one 39a is connected to ground through a load resistor 41, while base two 39b is connected to the positive voltage line 26 through a resistor 42. The common between the unijunction transistor base one 39a and the resistor 41 are connected to the gate 20g of the alarm circuit SCR 20.

A zener diode 43 is connected between the positive voltage line 26 and ground to suppress transients and regulate the voltages across the timers 23 and 33. A suppression protecting diode 44 is connected across the alarm device 19.

In the operation of the invention, an authorized operator of an automobile equipped with an alarm system according to the present invention as shown in FIG. 1, would close the main switch 13 just prior to leaving the automobile. The exit timer 23 would be energized, and the time delay would enable the authorized person to depart from the automobile and close and lock the doors without causing the alarm device 19 to sound. Closing of the courtesy light switch 16 during the running of the time delay of the exit timer 23 would have no effect on the triggering circuit 11, since the cathode 36c of the triggering circuit SCR 36 would not have a path to ground through SCR 31, because the SCR 31 of the circuit 12 had not yet been fired.

Following timing out of the exit timer 23, the unijunction transistor 28 is fired, thereby applying a voltage to the gate of the presetting circuit SCR 31 rendering it conducting to connect the cathode 36c of the triggering circuit SCR 36 to ground, thereby readying it for firing and establishing the setting or arming of the alarm system.

Thereafter, closing of the courtesy light switch 16 in response to opening of a door associated with such a switch, causes the application of a voltage to the gate 36g of the triggering circuit SCR 36, rendering it conductive to energize the entrance timer 33. A suitable time delay of about 5 to 15 seconds may be built into the entrance timer 33, and which would allow ample time for an authorized person to enter the automobile and open the main switch 13 and prevent sounding of the alarm device 19. An unauthorized person entering the automobile would not be aware of the alarm system, and would not, therefore, open the main switch 13. The entrance timer 33 would then time out and trigger operation of the alarm circuit 10 by applying a voltage to the unijunction transistor 39 causing it to fire and, in turn, apply a voltage to the gate 20g of the alarm circuit SCR 20. This would render the SCR 20 conducting and cause energization of the alarm device 19 to sound the alarm and indicate unauthorized presence of a person within the automobile. The unsuspecting, unauthorized person would, no doubt, panic, if he had thought that the unauthorized entrance would go undetected; since the car did not appear to be equipped with an alarm system, and since nothing happened upon opening of the door.

Should an unauthorized person attempt to obtain access to the engine compartment through the hood or the trunk compartment through the trunk door, closing of a protective switch (represented in the drawing at 21) would bypass the triggering circuit 11 and immediately apply a voltage to the gate 20g of the alarm circuit SCR 20 rendering it conducting and sounding the alarm. No time delay would be provided for the hood and/or trunk switch.

An alternative hookup arrangement for the alarm system of the present invention is illustrated in FIG. 2, this arrangement being applicable to automobiles having a courtesy light circuit arrangement different from that shown in FIG. 1. It is also applicable to use with the courtesy light circuit arrangement of FIG. 1 in that this hookup arrangement is dependent upon detecting voltage across the lamp of the courtesy light or detecting a voltage across the courtesy light circuit to trigger a pulse or signal generating circuit 46 that, in turn, triggers the triggering circuit 11. The courtesy light switch 16a is shown as connected at one side to ground and at the other side to the courtesy light 17a. The other side of the courtesy light 17a is connected to the positive potential. The pulse-generating circuit 46 detects voltage across the courtesy light or lamp 17a, and includes a pulse transformer 47 having windings 48 and 49. The winding 48 is connected across the courtesy light 17a and includes an isolation capacitor 50 at one side between one end of the winding and one side of the courtesy lamp. One side of the winding 49 of the pulse transformer is connected directly to ground, while the other side is connected to ground through an isolation capacitor 51 and a gate load or bleeder resistor 52. The output of the pulse transformer circuit arrangement is taken between the isolation capacitor 51 and the resistor 52, and connected directly to the gate 36g of the triggering circuit SCR 36. Closing the courtesy light switch 16a triggers the pulse transformer circuit to deliver a pulse to the gate 36g of the SCR 36 and cause the SCR to conduct for energizing the triggering circuit 11 as heretofore explained.

While FIG. 2 illustrates a pulse transformer triggering circuit arrangement for detecting the energization of the courtesy light in connection with a courtesy light circuit of the type where one side of the courtesy light switch is connected to ground, it should be appreciated that this detection circuit can also be used with the courtesy light circuit arrangement shown in FIG. 1 in place of the voltage divider arrangement shown therein.

A further modification of the alarm system according to the invention is illustrated in FIG. 3, which differs from the embodiment of FIG. 2, in the manner of the signal generating circuit operated by the courtesy light circuit of the automobile, the provision of a pulse transformer which is triggered when the hood and/or trunk door are opened, and in the provision of utilizing the alarm system to completely disable the ignition system of the automobile and prevent it from operating. The alarm system of FIG. 3 is identical to those illustrated in FIGS. 1 and 2 with respect to the alarm circuit 10A, presetting circuit 12A, and the exit timer 23A. For purposes of clarity, the components in these circuits are identified by the same numerals used in FIGS. 1 and 2. The triggering circuit 60 and entrance timer 61 differ from the triggering circuit 11 and entrance timer 33 only in that the resistor provided in the entrance timer, and designated by the numeral 62 is variable so that the time delay on the entrance timer can be adjusted if desired.

The circuitry in FIG. 3 differs from those of FIGS. 1 and 2 further in that a resistor 63 in series with a capacitor 64, between the main switch 13A and ground, defines a decoupling circuit to prevent false triggering of the alarm, once the alarm has been set. In particular, this circuit suppresses any spike that might be induced in the overall circuit such as by a passing bus or vehicle generating a large voltage component.

The pulse or signal generating circuit for connection to the courtesy light circuit is generally designated by the numeral 66 and includes a pulse transformer 67 having an input winding 68 and an output winding 69. The input winding 68 is adapted to be connected to a courtesy light circuit at terminals 70 and 71, which are coupled to the input winding 68 through capacitors 72 and 73 that wave shape the pulse to define a strong sharp spike for pulsing the transformer 67. One side of the input winding 68 is connected to the positive potential through an alternating current coupling circuit composed of a resistor 74 and a capacitor 75.

The output winding 69 is connected on one side to ground and on the other side to the gate of the triggering circuit SCR 36 through a steering diode 76, the latter of which functions to insure turning on of the SCR in response to a positive pulse.

Courtesy light circuits are illustrated in FIGS. 4 and 5. The circuit in FIG. 4 which is of the type found in Ford automobiles includes a lamp 78 connected on one side to ground and on the other side to the side of a courtesy light switch 79. The other side of the switch is connected to positive potential. The terminals 70 and 71 of the signal-generating circuit 66 are connected to opposite sides of the lamp 78 through terminals 80 and 81. Closing of the courtesy light switch 79, whether the lamp 78 energizes or not, will trigger the pulse transformer 67 to energize the entrance timer 61. Thereafter, the operation of the circuitry is the same as heretofore explained, in that timing out of the entrance timer before opening of the main switch 13A will energize the alarm circuit 10A and sound the alarm device.

The courtesy light circuit shown in FIG. 5, which is typical of other make automobiles, differs from that of FIG. 4 only in that the switch is on the ground side of the lamp, wherein the lamp 83 is connected on one side to positive potential and on the other side to one side of the courtesy light switch 84. The other side of the switch is connected to ground, and the terminals 70 and 71 of the signal-generating circuit 66 are connected to opposite sides of the lamp 83 through terminals 85 and 86. Closing of the switch 84 will likewise pulse the transformer 67 and start the timing of the entrance timer 61.

The hood and trunk switches, identified as 88 and 89, upon either closing, trigger a pulse transformer 90, which bypasses the triggering circuit 60 to immediately energize the alarm circuit 10A. The pulse transformer 90 includes an input winding 91 and an output winding 92. The input winding is connected on one side to one side of each of the hood and trunk switches, and on the other side to positive potential through an alternating current coupling circuit defined by a resistor 93 and a capacitor 94. The other side of the switches are connected to ground. One side of the output winding is connected to ground and the other side is connected to base one of the triggering circuit unijunction transistor 39 and the gate to the alarm circuit SCR 20. A capacitor 95 is connected across the output winding 92 to slow down the gate firing time which will suppress transients. Otherwise, the transformer 90 isolates the hood and trunk switches from the other circuits in the alarm system.

An important feature of this system is that it will prevent a car from starting when the alarm circuit system main switch 13A is closed by disabling the ignition circuit of the car. A line is provided for connecting it to the points side of the high-voltage ignition coil to effectively connect the primary winding of the ignition coil to kill the back EMF normally produced by the coil. This is accomplished by connecting the positive potential through a diode 97 and line 98 to the points side of the ignition coil.

A typical ignition circuit 99 is illustrated in FIG. 3, but it should be appreciated that the present invention is useful on any ignition circuit employing a coil. The ignition circuit 99 includes a coil 100 having a primary winding 101 and a secondary winding 102. The primary winding 101 is connected on one side to the positive potential and on the other side through a load resistor 103 to one side of the ignition points 104. The other side of the points are connected to ground. A capacitor 105 is connected across the points 104. One side of the secondary winding 102 is connected to one side of a spark plug 106, while the other side of the windings and the other side of the spark plug are connected to ground. The usual distributing arrangement is omitted for purposes of clarity. Normally, a back EMF generated in the primary winding 101 induces a high voltage in the secondary and arcing or sparking at the spark plug, but connection of the primary winding 101 through the diode 107 kills this back EMF and reduces the efficiency to obtain the necessary spark at the spark plug to initiate combustion. An arc suppressing capacitor 107 is connected across the main switch 13A. Therefore, when the main switch 13A of the alarm system is closed, even if the alarm circuit does not operate to sound the horn or siren, it will not be possible to start the automobile.

An alternate form for utilizing the alarm system to disable the ignition circuit is illustrated in FIG. 6, wherein the main switch, designated 109 is in the form of a single throw double pole switch. The switch 109 includes a switch arm 109a which serves to energize and deenergize the entire alarm circuitry, and a switch arm 109b which is connected on one side to ground, and provided with a line 110 on the other side to connect terminal 110a to the points side of the ignition coil. An arc suppressing capacitor 111 is connected across the switch arm 109a. Closing of the switch 109 will energize the alarm system circuitry while at the same time grounding the primary of the ignition coil and the points to prevent a voltage from being induced in the coil.

Inasmuch as an electric clock or similar device might trigger the alarm circuitry, for those automobiles having such a clock, it is necessary to install a choke or input filter between the clock and the positive potential, as illustrated in FIG. 7, the choke being designated 113, and the clock is designated 114. The choke 113 includes a choke coil 115 connected in series with a diode 116 between the positive potential and the clock. Capacitors 117 and 118 are connected between ground and the opposite ends of the choke coil 115. Accordingly, the choke 113 will allow the clock to operate when the alarm circuitry is set, and the clock operation will not affect the alarm circuitry.

The embodiment of FIG. 3 may be used in connection with a siren or a horn, wherein the siren or horn is connected off the low side of the alarm circuit SCR 20.

The embodiment of FIG. 8 differs only in that the alarm device is connected off the high side of the alarm circuit SCR 120, and therefore, only a siren can be utilized in connection with this circuitry. Otherwise, this alarm system is the same as that of FIG. 3, and the same numerals will be applied, except in connection with the alarm circuit 121. The anode 120a of the SCR 120 is connected to the positive potential, while the cathode 120c is connected to one side of the siren 122. The other side of the siren is connected to ground. The gate 120g is connected to the base one of the triggering circuit unijunction transistor 39. A capacitor 123 is connected across the secondary load winding of the pulse transformer 90 to define a slow rate of gate firing to avoid firing by transients in the circuit. A diode 124 is connected across the siren 122 to suppress back EMF caused by the inductive load of the siren.

Figure 9:
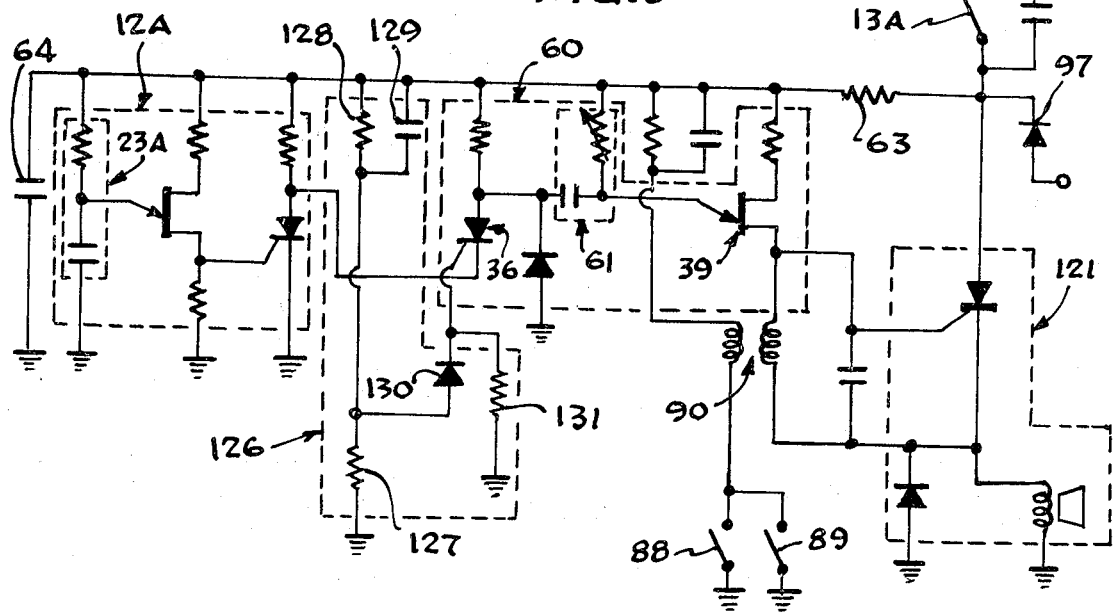
FIG. 9 is an electrical schematic diagram showing a modified triggering circuit which detects a voltage drain in the electrical circuitry of an automobile.

The embodiment of FIG. 9 differs from that of FIG. 8 only in that the signal generating circuit for activating the entrance timer is self-contained within the circuitry and operates to sense any voltage drain in the electrical circuitry of the car. The circuit 126 therefore replaces the pulse transformer signal generating circuit 66. Circuit 126 includes a resistor 127 connected on one side to ground, and on the other side to the positive potential through an alternating current coupling circuit composed of a resistor 128 and a capacitor 129, and to the gate of the triggering circuit SCR 36 through a diode 130. A resistor 131 is connected between ground and the common of the diode 130 and the gate of SCR 36. It should be appreciated that a suppressor must be employed on an electric clock or like device in the automobile so that drainage of the battery by the clock will not be sensed by the signal generating circuit 126. Otherwise, the circuit 126 will sense any voltage drain such as when a courtesy light circuit is energized, the head lights are turned on, an attempt is made to start the car, or otherwise.

Figure 10:
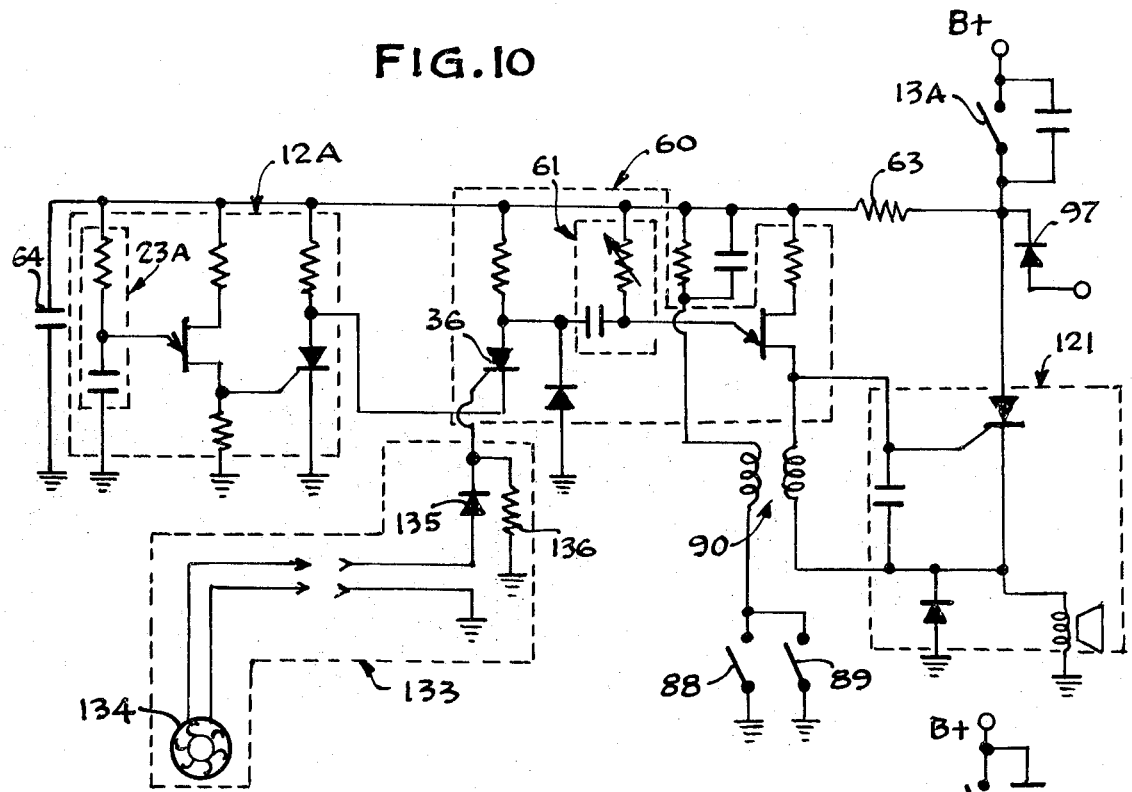
FIG. 10 is a further modified electric schematic diagram of an alarm circuit, illustrating another arrangement for detecting operation of the courtesy light circuitry.

Another form of signal-generating circuit for operating the entrance timer is illustrated in FIG. 10, and is designated as 133. Otherwise, the alarm system here is the same as that shown in FIGS. 8 and 9. The signal-generating circuit 133 includes a sensing coil 134 in the form of a ferrite core or toroid, one side of which is connected to ground and the other side of which is connected to the gate of the triggering circuit SCR 36 through a diode 135. A resistor 136 is connected between ground and the gate of the SCR 36 to provide a load on the gate. The coil 134 is adapted to have either the courtesy light fuse inserted therethrough, whereby the coil senses any current passing through the fuse or wire and produces a signal to render the SCR 36 conducting and activating the entrance timer 61. Therefore, to connect the circuitry of this embodiment to respond to the courtesy light circuitry, it may be accomplished by removing the courtesy light fuse and inserting same into the coil 134, and thereafter replacing the fuse, or by splitting the wire feeding the courtesy light circuit and stringing same through the coil 134 and reconnecting the split wire, or by bending a portion of the wire leading to the courtesy light circuit and inserting same into the coil 134.

Figure 11:
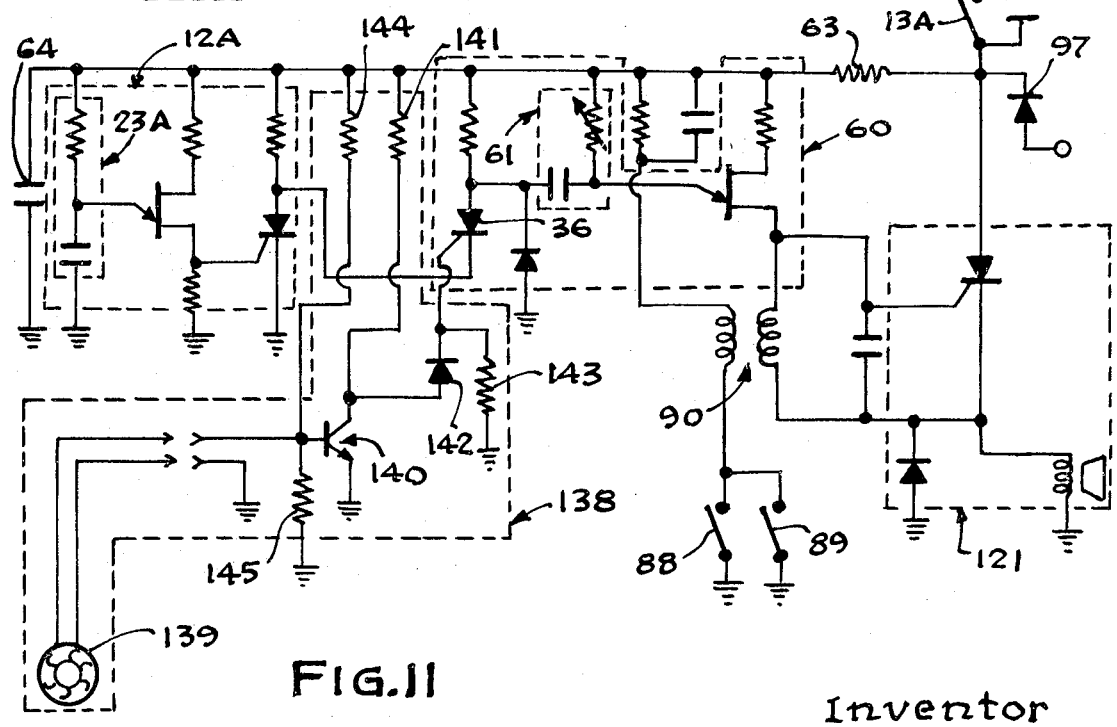
FIG. 11 is a still further modification illustrating an electrical schematic diagram, wherein an amplifier is provided for amplifying a signal detected from the courtesy light circuitry.

Another form of pulse-generating circuit responsive to the courtesy light circuit of an automobile is illustrated in FIG. 11, and designated by the numeral 138.

This pulse generating circuit is similar to that disclosed in FIG. 10 in that it employs a current sensing coil installable in the same fashion as the coil 134, either in connection with the courtesy light fuse or a wire feeding the courtesy light circuit. However, this coil, designated as 139 is in the form of plastic, which is not capable of generating a pulse or signal as strong as that which can be generated by the coil 134. Accordingly, the signal from the plastic coil 139 must be amplified before being delivered to the gate of the SCR 36. One side of the coil 139 is connected to ground and the other side is connected to the base of transistor 140, which forms the heart of the amplifier. The emitter of the transistor 140 is connected to ground while the collector is connected to the positive potential through a resistor 141, and to the gate of the SCR 36 through a diode 142. A resistor 143 is connected between ground and the common of the SCR 36 and the diode 142. A voltage divider composed of resistors 144 and 145 is arranged between the coil 139 and transistor 140. Operation of the courtesy light circuitry causes a current flow in the coil 139 which is amplified and causes the SCR 36 to conduct, thereby energizing the entrance timer of the system. Otherwise, this embodiment operates the same as those shown in FIGS. 8, 9 and 10.

It will be understood that modifications and variations may be effected without departing from the scope of the novel concepts of the present invention, but it is understood that this application is to be limited only by the scope of the appended claims.

This invention is hereby claimed as follows:

1. In an automobile including a door-operated courtesy light circuit, a solid state burglar alarm system comprising a main switch located at a hidden location within the automobile and connected between the system and positive potential and operable to energize and deenergize the alarm system, a presetting circuit having an exit timer, a triggering circuit connected to the output of said presetting circuit and having an entrance timer, an alarm circuit connected to the output of said triggering circuit having a sound generating alarm device, a pulse generating circuit responding to the courtesy light circuit for generating a signal capable of energizing said triggering circuit, so that the triggering circuit is fired following timing out of the exit timer upon leaving the automobile and timing out of the entrance timer upon entering the automobile and energizing the courtesy light circuit, whereby upon closing the main switch an authorized person will have a given time to leave the automobile before the exit timer times out and arms the system, and thereafter the authorized person may enter the automobile through a door and deactivate the alarm system before the entrance timer times out without firing the alarm circuit, while an unauthorized person entering a door of the automobile will cause the alarm circuit to fire when the entrance timer times out.

2. The combination as defined in claim 1, wherein said triggering circuit includes an SCR having the gate connected to said signal generating circuit so that once the main switch is closed and the exit timer is timed out, closing of said courtesy light circuit fires said SCR to energize said entrance timer, and a unijunction transistor receiving the output of said entrance timer.

3. The combination as defined in claim 2, and an SCR in the presetting circuit having the cathode connected to ground and the anode connected mutually to positive potential and the cathode of the triggering circuit SCR, a diode connected between said entrance timer and ground to permit a pulse to be delivered to the unijunction transistor when the entrance timer times out, whereby firing of both SCR's applies a voltage to the entrance timer to commence timing out.

4. The combination as defined in claim 2, wherein means connects the anode of the triggering circuit SCR to the entrance timer and to positive voltage through a resistor.

5. The combination as defined in claim 4, and said presetting circuit including a unijunction transistor connected to the output of the exit timer, and means connecting the output of the unijunction transistor to the gate of the presetting circuit SCR.

6. The combination as defined in claim 1, wherein said pulse-generating means includes a voltage divider.

7. The combination as defined in claim 1, wherein said pulse generating means includes a pulse transformer circuit.

8. The combination as defined in claim 1, wherein said pulse-generating means includes a ferrite core coil adapted to coact with the courtesy light circuit fuse or a wire in the courtesy light circuit to detect current flow resulting from energizing the courtesy light circuit.

9. The combination as defined in claim 1, wherein said pulse-generating means includes a plastic core coil adapted to coact with the courtesy light circuit fuse or a wire in the courtesy light circuit to detect current flow resulting from energizing the courtesy light circuit, and an amplifier for amplifying the signal generated by the coil.

10. The combination as defined in claim 1, wherein the automobile includes an ignition system having breaker points and a high voltage coil connected thereto, and wherein said alarm system includes a line having a diode and being connected from the circuit side of the main switch to the points side of the high-voltage coil, whereby closing the main switch effectively connects the diode across the coil thereby killing any back EMF generated and disabling the ignition system to prevent starting the automobile.

11. The combination as defined in claim 1, and means bypassing the entrance timer to immediately energize said alarm circuit and the sound device in response to closing of switches operable by the hood and/or trunk.

12. The combination as defined in claim 1, wherein the automobile includes an ignition system having breaker points and a high-voltage coil connected thereto, and wherein a second switch operable simultaneously with said main switch is connected between ground and the points side of the high-voltage coil thereby disabling the ignition circuit when the second switch is closed.

13. In an automobile having an electrical system for powering headlights, courtesy lights, horn, ignition system or the like, a solid state burglar alarm system comprising a main switch located at a hidden location within the automobile and connected between the alarm system and the positive potential of the electrical system and operable to energize and deenergize the alarm system, an alarm circuit having a sound generating alarm device to be energized upon triggering of the alarm system, a triggering circuit having an entrance timer for delaying the output of the triggering circuit after an input signal is received thereby, means connecting the output of the triggering circuit to the alarm circuit whereby the alarm circuit will be energized in response to timing out of the entrance timer, a presetting circuit having an exit timer, wherein the presetting circuit is latched and the alarm system is armed upon timing out of the exit timer, means connecting the input of the presetting circuit to the main switch whereby closing the main switch energizes the presetting circuit to start timing out of the exit timer, a signal-generating circuit comprising a voltage sensor sensing any voltage drain in the electrical system except that which may be suppressed and energizing the triggering circuit upon sensing voltage drain to start the timing out of the entrance timer, and means bypassing the entrance timer to immediately energize said alarm circuit and the sound device in response to closing of switches operable by the hood and/or trunk.

14. The combination as defined in claim 13, wherein the ignition system includes breaker points and a high-voltage coil connected thereto, and wherein said alarm system includes a line having a diode and being connected from the circuit side of the main switch to the points side of the high-voltage coil, whereby closing the main switch effectively connects the diode across the coil thereby killing any back EMF generated and disabling the ignition system to prevent starting the automobile.

* * * * *